Patented May 10, 1938

2,116,553

UNITED STATES PATENT OFFICE 2,116,553

DYEING PROCESS

Alfred William Baldwin, Harold Blackshaw, and Clarence Sydney Woolvin, Blackley, England, assignors to Imperial Chemical Industries Limited, a corporation of Great Britain No Drawing. Application January 23, 1936, Serial No. 60,524. In Great Britain January 24, 1935

3 Claims. (Cl. 8—5)

This invention relates to processes of dyeing and to materials dyed by the new processes. The invention also relates to means of increasing the fastness to rubbing of dyestuffs on animal and vegetable fibers. More particularly the invention relates to the dyeing of fibers in accordance with the principles of the invention in the presence of compounds having the formula R—COOX—(OH)$_n$ in which R is an aliphatic or cycloaliphatic radical of not less than eight carbon atoms, X is an aliphatic residue which may contain ether groups, and $n$ is an integer not less than 3. The invention will be described with particular reference to the dyeing of animal fibers with indigo, chrome, or lactam-condensation dyestuffs, and with respect to the dyeing of vegetable fibers with insoluble azo dyes, but these particular illustrative descriptions should be considered as exemplary and not limitative of the invention.

Dyeings on animal fiber, for instance wool, with indigo and chrome dyestuffs and the dyestuffs which are formed by lactam condensation effected on the fiber according, for instance, to British application 14437/33 and U. S. Patent 2,036,196 dated April 7, 1936, are, in general, of good fastness but are liable to suffer from the defect of rubbing off somewhat readily, thus soiling white or other material with which such dyeings come into contact. These dyes are water-insoluble dyes produced or formed on the fibre. Insoluble indigo dye is formed on the fibre by oxidation, chrome dyes are made insoluble by chroming with or without oxidation, insoluble azo dyes are formed on the fibres by coupling with other substances, such as substances of the type Naphthol A S, and lactam dyes are formed on the fibre by acid condensation to form the lactam, all as fully understood in the art.

We have found that dyeings on animal fiber of the above mentioned dyestuffs may be produced of greatly increased fastness to rubbing by treating the material to be dyed either before, during or after the dyeing operation with condensation products having the formula R—COOX—(OH)$_n$ in which R is an aliphatic or cycloaliphatic radical of not less than eight carbon atoms, X is an aliphatic residue which may contain ether groups and $n$ is an integer not less than 3. As such we mention (a) condensation products derived from higher fatty or higher cycloaliphatic acids containing eight or more carbon atoms, and an excess of glycerol under such conditions as to give an ester of polyglycerol. Instead of glycerol the already formed polymerization products of glycerol such as di- or triglycerol may be used. (b) Condensation products of higher fatty acids as mentioned under (a) with excess of polyvalent alcohols containing more than three hydroxyl groups such as sorbitol, erythritol, lower sugars or polymerization products of such alcohols in place of glycerol or polyglycerols as mentioned under (a).

Dyeings on cellulosic material, whether of natural or artificial origin, for instance cotton, linen, artificial viscose silk and the like, produced by means of so-called azoic colors, that is to say insoluble colored azo pigments produced on the fiber are, in general, of good fastness but are liable to suffer from the defect of rubbing off somewhat readily, thus soiling white or other material with which such dyeings come into contact. This defect of looseness to rubbing is liable to occur in whatever form the material may be dyed, but it is especially apparent when the dyeing is conducted on compactly wound thread, for instance in the form of cops, cheeses, beams, and the like.

We have found that dyeings on cellulosic material of the above mentioned dyestuffs may be produced of greatly increased fastness to rubbing by employing as assistants during the dyeing operation the condensation products above identified.

Under the term "indigo" we also include halogenated indigos and the water-soluble sulfuric esters of leuco indigo and under chrome dyestuffs we include all such insoluble dyes produced on the fibre however applied, whether on chrome mordanted material or by the metachrome, chromate or afterchrome process.

Under the term "azoic dyestuffs" we include all water-insoluble organic pigments produced on the fiber by coupling a suitable component with diazonium compounds and more especially such as are produced by means of the arylamides of 2-hydroxy-3-naphthoic acid or products containing methylene groups capable of combination with diazo compounds, for instance, the arylamides of aceto-acetic acid.

Cops, cheeses, beam warps and loose cotton when dyed in circulating machines with azoic coloring matters are liable to act as filters for the loose pigment which is unavoidably formed during the dyeing operation and consequently the inner or outer surfaces of the cop, etc., is apt to be covered by a layer of loose dyestuff which is very difficult to remove entirely during the hot alkaline treatment which is usually applied towards the end of the dyeing operation.

By the addition to the developing liquor of the condensation products previously mentioned, the difficulties of obtaining dyeings fast to rubbing are largely overcome. This is believed to be due to the fact that these condensation products lead to the formation of dyestuff in such a highly dispersed condition that the cop or other yarn package no longer acts as a filter but the dyestuff in its colloidally dispersed form passes through the material very much as if it were a true solution of dye.

The following examples illustrate but do not limit the invention. The parts are by weight unless otherwise specified.

Example I

An indigo vat is prepared by vatting at 50° C. for twenty minutes indigo grains 60% (1 part), ammonia sp. gr. 0.880 (4.4 parts) and sodium hydrosulfite conc. powder (1 part).

0.3 part of the product obtained by condensing oleic acid (120 parts) with glycerol (400 parts) in the presence of potassium hydroxide (0.5 part) and water (1 part) at a temperature of 280–290° C. for 12 hours, is then added and the whole cooled to 40° C.

Wool slubbing (10 parts), which has been thoroughly wetted out with water is entered and dyeing is carried out at this temperature for 30 minutes and subsequent working up is as usual.

Dyeings so obtained are characterized by excellent fastness to rubbing, being considerably superior in this respect to dyeings obtained by the normal dyeing method.

It is immaterial whether the condensation product of glycerol with a higher fatty acid is added to the bath before or after the vatting process.

The process is equally applicable to other forms of indigo vat e. g. the fermentation of zinc-lime vat.

Example II

To a dyebath containing 1.6 parts of a chrome dye, namely Solochrome Black pV (Color Index No. 170) 1.6 parts of sodium sulfate and 0.8 part of acetic acid (30%) per 1000 parts of water, there is added 0.4 part of the condensation product mentioned in Example I.

Wool slubbing (16 parts), which has been wetted out previously, is then entered and the temperature of the dyebath is slowly raised to 95° C. and maintained at this temperature for 30 minutes. An addition of 16 parts (by volume) of a 1% sulfuric acid solution is now made, a temperature of 95° C. maintained for a further 30 minutes and a solution of 0.45 part of potassium dichromate added. Heating is continued for a further 30 minutes at this temperature. The slubbing is then removed, rinsed well and dried. The dyeings so obtained are faster to rubbing than similar dyeings obtained by the normal process.

Example III

The lactam dyestuff of Example I of the type anthraquinonylamino-aniline-o-thioglycollic acid described in British specification 394,312 and U. S. Patent 2,015,011, dated September 17, 1935, is applied to the fiber in the following manner:—

0.2 part of the dyestuff powder is mixed with 10 parts of a 10% solution of Glauber salt, to which is then added 500 parts boiling water containing 0.5 part ammonium acetate, 0.1 part ammonia .880, and 0.1 part of the condensation product obtained as below.

10 parts of well wetted wool are entered into this bath; the solution is boiled for one hour, after which the fiber is removed and rinsed in cold water. The dyeing may then be entered into a boiling solution of 10 parts of 7½% aqueous sulfuric acid and 250 parts of water.

After 15 minutes lactamization is complete and the fiber is rinsed in dilute sodium carbonate solution and dried.

The wool is dyed a deep green shade.

The condensation product may be added to the acid lactamizing bath instead of to the initial bath or it may be added both to the initial bath and the lactamizing bath. In all cases the fastness to rubbing of the dyeing is promoted.

The condensation product mentioned in the above example may be obtained as follows:

120 parts of oleic acid are heated to 270–280° C. with 800 parts of glycerol in the presence of 1 part caustic potash and 2 parts water until the product is water-soluble.

Example IV

To a dyebath containing 1.6 parts of a chrome dye, namely Solochrome Black WDFA (Color Index No. 203), 1.6 parts of sodium sulfate and 0.8 part of acetic acid (30%) per 1000 parts of water, there is added 0.4 part of the product obtained by condensing cocoanut oil fatty acids (60 parts) with glycerol (400 parts) in the presence of potassium hydroxide (0.5 part) at a temperature of 280–285° C. until a water-soluble product is obtained.

Wool slubbing (16 parts) which has been wetted out previously is then entered and the temperature of the dyebath is slowly raised to 95° C. and maintained at this temperature for 30 minutes. An addition of 16 parts (by volume) of a 1% sulfuric acid solution is now made, a temperature of 95° C. maintained for a further thirty minutes and a solution of 0.45 part of potassium dichromate added. Heating is continued for a further thirty minutes at this temperature. The slubbing is then removed, rinsed well and dried. The dyeings so obtained are faster to rubbing than similar dyeings obtained by the normal process.

Example V

An indigo vat is prepared by vatting at 50° C. for 20 minutes indigo grains 60% (1 part), ammonium sp. gr. 0.880 (4.4 parts) and sodium hydrosulfite conc. powder (1 part). 0.3 part of the condensation product mentioned in Example IV is then added and the whole cooled to 40° C.

Wool slubbing (10 parts) which has been thoroughly wetted out with water is entered and dyeing is carried out at this temperature for 30 minutes and subsequent working up is as usual.

Dyeings so obtained are characterized by excellent fastness to rubbing, being considerably superior in this respect to dyeings obtained by the normal dyeing method.

Example VI

To a dyebath containing 1.0 part of a chrome dye, namely Solochrome Brown MGS (Color Index No. 101), 0.66 part of ammonium sulfate, 0.33 part of potassium dichromate per 1000 parts of water, there is added 0.4 part of the condensation product mentioned in Example I.

Wool slubbing (16 parts) is then entered and dyeing is carried out for one hour at the boil.

The dyeings so obtained are faster to rubbing than similar dyeings obtained by the normal process.

Example VII 100 parts of wool material in the form of loose wool, slubbing, yarn or piece, is impregnated at 30° C. for one-half hour in a bath consisting of 10 parts of the anilide of 2:3-hydroxy-naphthoic acid dissolved in the usual manner with 2 parts of the condensation product of naphthalene sulfonic acid and isopropyl alcohol, 15 parts of caustic soda 60° Tw. and water added to make the whole up to 2000 parts by volume.

The wool material treated as above is squeezed to remove excess liquor and then developed for one-half hour at 16°-20° C. in a bath made up as follows (for 100 parts material to be dyed):

2 parts m-nitro-p-toluidine are diazotized in the usual manner and the excess mineral acid neutralized with the required amount of sodium formate. The solution is made up to 2000 parts total volume with final addition of 2 parts of the condensation product described below and 20 parts of sodium chloride.

After development the material is rinsed first in dilute hydrochloric acid of 3 parts hydrochloric 32° Tw. per 1000 parts liquor followed by a rinse in cold water. This is followed by a rinse in dilute ammonia, (1 part ammonia 0.88 per 1000 parts liquor). After again rinsing in cold water the material is then treated for one-half hour at 50° C., in a bath containing 2 parts of the product obtained by the sulfonation of the mixture of alcohol resulting from the saponification of sperm oil, per 1000 parts liquor. After this treatment the material is well rinsed in water at 40° C.

The condensation product used in the above example may be prepared by heating cocoanut oil fatty acids (60 parts) with glycerol (400 parts) in the presence of potassium hydroxide (0.5 part) at a temperature of 280-285° C. until a product soluble in water is obtained.

Example VIII

Cotton cops weighing 50 kilos are impregnated for twenty to thirty minutes with 750 litres of a solution of the 5-chloro-o-toluidide of 2:3-oxynaphthoic acid by means of a cop dyeing machine, fitted with perforated skewers. The solution is prepared as follows:

2.5 kilos 5-chloro-o-toluidide of 2:3-oxynaphthoic acid are dissolved in the usual manner with Turkey red oil and caustic soda and with addition of formaldehyde. 15 kilos sodium chloride are added and the whole made up to 750 litres total volume, temperature 20-25° C. The surplus liquor is removed by applying vacuum and the cops then developed for 20-30 minutes in 750 litres of a solution prepared as follows:

7.5 kilos Brentamine Fast Red TR salt (commercial stabilized diazo compound of 5-chlor-o-toluidine) is dissolved in water and diluted to 750 litres total volume with addition of 40 kilos sodium chloride and 2.5 kilos of the oleyl ester of polyglycerol prepared as follows:

Oleic acid (120 parts) is condensed with glycerol (400 parts) in the presence of potassium hydroxide (0.5 part) and water (1 part) at a temperature of 280-290° C. for 12 hours.

Examination of the developing liquor after a few minutes' circulation shows it to be clear red in color and there is practically no deposition of pigment on the outside of the cops. If development is carried out without the addition of the oleyl ester of polyglycerol the liquor which is colored red after a few seconds' circulation rapidly becomes colorless owing to filtration of relatively coarse red pigment on the outside of the cops, which are seen to be coated with a flocculent red deposit.

After development the cops are rinsed in cold water followed by hot water and are then soaped at the boil for 20-30 minutes in 750 litres of a boiling soap solution containing 2 kilos soap and 1.5 kilos soda ash. The cops are finally rinsed in hot water.

The cops developed in presence of the oleyl ester of polyglycerol are very considerably superior in fastness to rubbing to cops dyed in the same manner but without addition of oleyl ester of polyglycerol.

As many apparently widely different embodiments of this invention may be made without departing from the spirit and scope thereof, it is to be understood that we do not limit ourselves to the specific embodiments thereof except as defined in the appended claims.

We claim:

1. In the process of dyeing textile material of wool with insoluble dyeings from dyes of the group consisting of indigo, lactam and chrome dyes, the step which comprises applying the dyestuff to the material in conjunction with an olefine monocarboxylic acid ester of polyglycerol which is obtainable by condensing glycerol and an acid from the group consisting of oleic acid and the fatty acids from natural oils which contain oleic acid as the main fatty acid constituent, in the presence of a small amount of potassium hydroxide and water at temperatures between 280° and 290° C. until a soluble product of condensation is formed, said glycerol and acid being in the proportion of 400 to 800 parts of glycerol to 120 parts of the acid.

2. In the process of dyeing textile material of wool in a dye bath with insoluble dyeings of dye from the group consisting of indigo, lactam and chrome dyes, the step which comprises dissolving in the bath before dyeing a soluble condensation product which is obtainable by condensing glycerol and an acid from the group consisting of oleic acid and the fatty acids from natural oils which contain oleic acid as the main fatty acid constituent, in the presence of a small amount of potassium hydroxide and water at temperatures between 280° and 290° C. until a soluble product of condensation is formed, said glycerol and acid being in the proportion of 400 to 800 parts of glycerol to 120 parts of the acid.

3. The process of dyeing woolen textile material in a vat of indigo dye which comprises dissolving in the vat before dyeing a soluble condensation product which is obtainable by condensing glycerol and an acid from the group consisting of oleic acid and the fatty acids from natural oils which contain oleic acid as the main fatty acid constituent, in the presence of a small amount of potassium hydroxide and water at temperatures between 280° and 290° C. until a soluble product of condensation is formed, said glycerol and acid being in the proportion of 400 to 800 parts of glycerol to 120 parts of the acid, and then oxidizing to develop the dye.

ALFRED WILLIAM BALDWIN.
HAROLD BLACKSHAW.
CLARENCE SYDNEY WOOLVIN.